3,321,480
TRIPHENYL-TIN-[PYRIDYL-N-OXIDE-(2)]-SULFIDE
Ludwig Schroder, Klaus Thomas, and Dietrich Jerchel, Biberach an der Riss, Germany, assignors to C. H. Boehringer Sohn, Ingelheim am Rhine, Germany, a limited partnership of Germany
No Drawing. Filed Feb. 18, 1964, Ser. No. 345,567
Claims priority, application Germany, Feb. 21, 1963, B 70,838
1 Claim. (Cl. 260—270)

This invention relates to novel organic compounds of tin as well as to bactericidal and fungicidal compositions comprising such tin compounds as active ingredients, and to a method of combatting bacteria and fungi with the aid of these novel tin compounds.

More particularly, the present invention relates to triphenyl - tin-[pyridyl-N-oxide-(2)]-sulfide, which is believed to have the structural formula

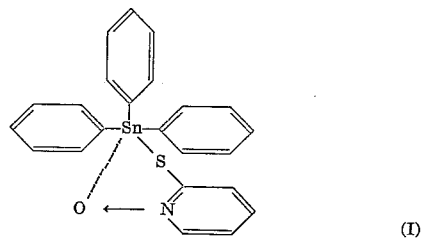

(I)

The novel compound according to the present invention is prepared by reacting 2-mercapto-pyridine-N-oxide with a triphenyl-tin compound of the formula $$(C_6H_5)_3SnX$$ (II)

wherein X is hydroxyl or the anion of an inorganic or organic acid.

The reaction is most advantageously performed at room temperature and in an inert organic solvent, using equimolar amounts of the starting compounds, that is, one mol of compound II for each mol of 2-mercapto-pyridine-N-oxide. When X in Formula II is hydroxyl, an inert solvent is advantageously used with the aid of which the water formed by the reaction can be removed from the reaction mixture by azeotropic distillation. An example of such solvents is benzene.

The reaction product may be purified and isolated by distilling the solvent from the reaction mixture, if necessary in vacuo, and recrystallizing the residue from a suitable solvent, such as ethanol.

The above-indicated structure of the novel compound according to the present invention is suggested by the article by I. R. Beattie et al. in Chemistry and Industry 1962, pages 1429–1430, which concerns pentacoordinated tin, as well as by the ultraviolet and infra-red spectra of the compound obtained in accordance with the present invention. The ultraviolet spectrum of the novel compound, triphenyl - tin - [pyridyl-N-oxide-(2)]-sulfide, is similar to but not identical with that of 2-mercapto-pyridine-N-oxide; the electron structure in the pyridine ring of triphenyl-tin-[pyridyl-N-oxide-(2)]-sulfide is changed from that of 2-mercapto-pyridine-N-oxide, whereas there is no change in the electron structure of the pyridine ring of triphenyl-tin-[pyridyl-(2)]-sulfide in relation to that of 2 - mercapto - pyridine-N-oxide. Also, in the infra-red spectrum of triphenyl - tin - [pyridyl-N-oxide-(2)]-sulfide only the bands of triphenyl-tin remain unchanged, whereas virtually all of the skeletal stretching vibrations in 2-mercapto-pyridine-N-oxide are more or less displaced. This proves a reciprocal effect of the N—O— bond with the tin.

The following examples illustrate the present invention and will enable others skilled in the art to understand the invention more completely. It should be understood, however, that the invention is not limited solely to the examples given below.

EXAMPLE I 36.7 gm. (0.1 mol) of triphenyl-tin hydroxide and 12.7 gm. (0.1 mol) of 2-mercapto-pyridine-N-oxide were dissolved in 200 cc. of benzene while stirring. After some time the benzene was distilled off, and the residual syrup was recrystallized from ethanol. 43.8 gm. (92% of theory) of triphenyl-tin-[pyridyl-N-oxide-(2)]-sulfide were obtained, which had a melting point of 110–112° C.

EXAMPLE II 38.6 gm. (0.1 mol) of triphenyl-tin chloride were dissolved in 150 cc. of methylene chloride. The resulting solution was shaken with 100 cc. of an aqueous 10% potassium hydroxide solution, the organic phase was separated from the aqueous phase, and the organic phase was admixed with a solution of 12.7 gm. of 2-mercapto-pyridine-N-oxide in 100 cc. of methanol. After standing for some time the reaction mixture was worked up as described in Example I, that is, by evaporating the solvent mixture and recrystallizing the residue from ethanol. 31 gm. (65% of theory) of triphenyl-tin-[pyridyl-N-oxide-(2)]-sulfide were obtained, which had a melting point of 110–112° C.

EXAMPLE III 40.9 gm. (0.1 mol) of triphenyl-tin acetate and 12.7 gm. (0.1 mol) of 2-mercapto-pyridine-N-oxide were dissolved in 250 cc. of acetone while stirring. Thereafter, the acetone was distilled off, and the residue was evaporated to dryness in vacuo. Subsequently, the residue was recrystallized from ethanol; before effecting the recrystallization, however, the ethanolic solution was filtered to remove undissolved solids. 2.4 gm. (50.5% of theory) of triphenyl - tin - [pyridyl-N-oxide-(2)]-sulfide were obtained, which had a melting point of 110–112° C.

*Analysis.*—Calculated: C, 58.0%; H, 4.02%; S, 6.73%; Sn, 25.0%. Found: C, 57.6%; H, 4.12%; S, 6.74%; Sn, 25.4%.

The compound according to the present invention, that is, the compound comprising pentacoordinated tin whose probable structural Formula I is shown above, has useful properties. More particularly, it has bactericidal and fungicidal properties with low toxicity. It is particularly effective against dermatophytes, such as epidermophyton which is one of the causative organisms of tinea pedis, commonly known as athlete's foot.

For pharmaceutical purposes, the compound according to the present invention is incorporated as an active ingredient into a solid or liquid inert, non-toxic carrier to form a bactericidal and fungicidal composition, notably one adapted for application to the skin, such as an emulsion concentrate, a suspension powder or a dusting powder. The concentration of the compound of the present invention in these compositions may vary from 0.1 to 2.5% by weight. In addition to the triphenyl-tin compound and the inert carrier, the compositions may also comprise such assistants as surfactive agents, dispersing agents and additions which increase the adherence properties of the compositions.

The following examples illustrate a few such compositions comprising the compound of the present invention as an active bactericidal and fungicidal ingredient. The parts are by weight unless otherwise specified.

EXAMPLE IV

*Emulsifiable concentrate*

20 parts of triphenyl-tin-[pyridyl-N-oxide-(2)]-sulfide were introduced, while stirring, into a mixture consisting of 70 parts of xylene and 5 parts of methyl ethyl ketone. Thereafter, the resulting mixture was uniformly admixed with 5 parts of nonylphenol-polyglycol ether.

Prior to actual use of the emulsion concentrate thus obtained for bactericidal and fungicidal purposes, the concentrate is diluted with water until the concentration of the triphenyl-tin compound in the aqueous emulsion is about 1% by weight. The emulsion may then be applied to the skin area infested with bacteria and fungi, and is highly effective in eradicating such bacteria and fungi, notably epidermophyton.

EXAMPLE V

*Suspendable powder*

50 parts of triphenyl-tin-[pyridyl-N-oxide-(2)]-sulfide were admixed with 5 parts of anhydrous sodium sulfate and 35 parts of kaolin, and the resulting mixture was further admixed with 9 parts of sodium lignin sulfonate and 1 part of sodium tetrapropylene benzene sulfonate.

The resulting suspension powder is used for bactericidal and fungicidal purposes in the same manner as the emulsion concentrate of the preceding example, that is, the powder is suspended in an amount of water such that the concentration of the triphenyl-tin compound is about 1% by weight, based on the weight of the overall suspension, and the suspension is then applied to the affected skin area.

EXAMPLE VI

*Dusting powder*

10 parts of triphenyl-tin-[pyridyl-N-oxide-(2)]-sulfide were admixed with 10 parts of kieselguhr, 25 parts by weight of powdered clay and 55 parts by weight of talcum, and the resulting mixture was finely milled.

The resulting dusting powder may be used as such to combat bacteria and fungi. It is particularly useful as a fungicidal foot powder for combatting athlete's foot.

While the present invention has been illustrated with the aid of certain specific embodiments, it will be apparent to others skilled in the art that the invention is not limited to these embodiments, and that various changes and modifications may be made without departing from the spirit of the invention or the scope of the appended claim.

We claim:

Triphenyl-tin-[pyridyl-N-oxide-(2)]-sulfide.

References Cited by the Examiner

UNITED STATES PATENTS

| | | | |
|---|---|---|---|
| 2,809,971 | 10/1957 | Bernstein et al. | 260—270 |
| 2,867,566 | 1/1959 | Weinberg. | |
| 3,027,372 | 6/1962 | Starrs | 260—270 |

ALEX MAZEL, *Primary Examiner.*

DONALD DAUS, *Assistant Examiner.*